(12) United States Patent
Petersson et al.

(10) Patent No.: US 12,034,506 B2
(45) Date of Patent: Jul. 9, 2024

(54) ANTENNA BEAM VIRTUALIZATION FOR WIDE BEAM WIRELESS COMMUNICATION

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/924,583

(22) PCT Filed: May 12, 2020

(86) PCT No.: PCT/EP2020/063240
§ 371 (c)(1),
(2) Date: Nov. 10, 2022

(87) PCT Pub. No.: WO2021/228376
PCT Pub. Date: Nov. 18, 2021

(65) Prior Publication Data
US 2023/0179276 A1    Jun. 8, 2023

(51) Int. Cl.
*H04L 5/12*    (2006.01)
*H01Q 21/24*    (2006.01)
(Continued)

(52) U.S. Cl.
CPC ........... *H04B 7/0617* (2013.01); *H01Q 21/24* (2013.01); *H01Q 25/001* (2013.01); *H04B 7/088* (2013.01)

(58) Field of Classification Search
CPC ...... H04B 7/0617; H04B 7/088; H01Q 21/24; H01Q 25/001
(Continued)

(56) References Cited

U.S. PATENT DOCUMENTS

| 6,426,726 B1 * | 7/2002 | Yablon | H01Q 19/08 |
| | | | 343/754 |
| 6,512,480 B1 * | 1/2003 | Reudink | H04B 7/10 |
| | | | 342/361 |

(Continued)

FOREIGN PATENT DOCUMENTS

| EP | 1 050 923 A2 | 11/2000 |
| EP | 3507915 A1 | 7/2019 |

OTHER PUBLICATIONS

International Search Report and Written Opinion issued in International Application No. PCT/EP2020/063240 dated Feb. 11, 2021 (12 pages).

(Continued)

*Primary Examiner* — Helene E Tayong
(74) *Attorney, Agent, or Firm* — Rothwell, Figg, Ernst & Manbeck, P.C.

(57) ABSTRACT

A method of configuring a dual polarized antenna array for communication between a wireless device (120) and a wireless access network (100), the antenna array comprising antenna elements with respective polarizations, where each antenna element is associated with a respective beamforming weight, the method comprising configuring the antenna array for transmission by a first set of beamforming weights $w_{TX1}$, wherein the first set of beamforming weights is arranged to provide a transmit antenna port connected to antenna elements of a first polarization and of a second polarization, wherein the transmit antenna port is associated with an antenna power pattern; transmitting a first signal via the transmit antenna port on a downlink, DL, from the antenna array to the wireless device; configuring the antenna array for reception by a second $w_{RX1}$ and a third $w_{RX2}$ set of beamforming weights, wherein the second set of beamforming weights $w_{RX1}$ is arranged to provide a first receive antenna port connected to antenna elements of the first and (Continued)

of the second polarization, wherein the third set of beamforming weights $w_{RX2}$ is arranged to provide a second receive antenna port connected to antenna elements of the first and of the second polarization, where each of the receive antenna ports is associated with the antenna power pattern, and where the receive antenna ports have different polarizations; and receiving a second signal on an uplink, UL, from the wireless device (120) to the antenna array, via the first receive antenna port and the second receive antenna port.

20 Claims, 4 Drawing Sheets

(51) Int. Cl.
    *H01Q 25/00*     (2006.01)
    *H04B 7/06*     (2006.01)
    *H04B 7/08*     (2006.01)

(58) Field of Classification Search
    USPC .......................................................... 375/262
    See application file for complete search history.

(56) References Cited

U.S. PATENT DOCUMENTS

| | | | |
|---|---|---|---|
| 2004/0157645 A1 | 8/2004 | Smith et al. | |
| 2012/0069780 A1* | 3/2012 | Athley ................. | H04B 7/0837 370/280 |
| 2012/0319900 A1* | 12/2012 | Johansson .............. | H01Q 21/26 342/368 |
| 2013/0257655 A1* | 10/2013 | Hu ........................ | H04B 7/0413 342/373 |
| 2016/0135180 A1* | 5/2016 | Yuan ...................... | H01Q 21/22 370/329 |
| 2017/0352953 A1 | 12/2017 | Petersson et al. | |
| 2018/0183509 A1* | 6/2018 | Luo .......................... | H04B 7/01 |

OTHER PUBLICATIONS

International Preliminary Report on Patentability (IPRP) issued in International Application No. PCT/EP2020/063240 dated Apr. 8, 2022 (18 pages).
3GPP TS 38.211 V16.1.0 (Mar. 2020), 3rd Generation Partnership; Technical Specification Group Radio Access Network; NR; Physical channels and modulation (Release 16), Mar. 2020 (130 pages).

\* cited by examiner

FIG. 10

ANTENNA BEAM VIRTUALIZATION FOR WIDE BEAM WIRELESS COMMUNICATION

CROSS REFERENCE TO RELATED APPLICATIONS

This application is a 35 U.S.C. § 371 National Stage of International Patent Application No. PCT/EP2020/063240, filed 2020 May 12.

TECHNICAL FIELD

The present disclosure relates to wireless communication systems where wireless devices connect to a network of access points, or transmission points (TRP). The disclosure is of particular relevance to the fifth generation (5G) new radio (NR) systems defined by the third generation partnership program (3GPP) but can also be applied in other types of wireless communication systems comprising configurable antenna arrays.

BACKGROUND

Most wireless access networks comprise procedures for initial access to the network. These routines involve, e.g., synchronization procedures, authentication mechanisms, and exchange of various control parameter values.

The 3GPP 5G communication systems define a synchronization signal block (SSB) which is transmitted from the access point (gNB) to wireless devices. The SSB is discussed in, e.g., 3GPP TS 38.101 version 16.3.0, 3GPP TS 38.211 version 16.1.0, and 3GPP TS 38.213 version 16.1.0. A wireless device wishing to connect to a 5G access network receives the SSB transmission from the gNB, and then performs a random access (RA) procedure in order to synchronize with the network.

Many NR TRPs comprise advanced antenna systems (AAS) that enable beamforming techniques which allow narrow high gain antenna beams to be directed at specific wireless devices. However, the initial access procedure, i.e., the transmission of the SSB on downlink (DL) from the gNB to the wireless device, and the reception of the response signals from the wireless device on uplink (UL), is often performed using relatively wide antenna beams associated with reduced gain compared to the more narrow beams.

It is desired to improve performance of wireless communication systems during the initial access procedure.

Some communication sessions are of limited time duration and will use the wide beams for the entire communication session, since the overhead associated with setting up a higher gain beam may be significant. It is also desired to improve communication conditions for such wireless devices.

SUMMARY

It is an object of the present disclosure to provide methods, antenna arrays, control units, beamforming control logic, and wireless access networks which alleviate at least some of the above-mentioned issues.

This object is at least partly obtained by a method of configuring a dual polarized antenna array for communication in a wireless access network. The antenna array comprises antenna elements with respective polarizations, where each antenna element is associated with a respective beamforming weight. The method comprises configuring the antenna array for transmission by a first set of beamforming weights $w_{TX1}$, wherein the first set of beamforming weights is arranged to provide a transmit antenna port connected to antenna elements of a first polarization and of a second polarization, wherein the transmit antenna port is associated with an antenna power pattern. The method also comprises transmitting a first signal via the transmit antenna port on a downlink of the wireless access network. The method further comprises configuring the antenna array for reception by a second $w_{RX1}$ and a third $w_{RX2}$ set of beamforming weights, wherein the second set of beamforming weights $w_{RX1}$ is arranged to provide a first receive antenna port connected to antenna elements of the first and of the second polarization, and wherein the third set of beamforming weights $w_{RX2}$ is arranged to provide a second receive antenna port connected to antenna elements of the first and of the second polarization, where each of the receive antenna ports is associated with the antenna power pattern, and where the receive antenna ports have different polarizations. The method also comprises receiving a second signal on an uplink of the wireless access network, via the first receive antenna port and the second receive antenna port.

This way a radio transceiver system using the antenna array becomes less sensitive to, e.g., gain fluctuations for the different received polarizations. In other words, a receiver connected to the antenna array and receiving signals from, e.g., a wireless device, becomes less sensitive to the polarization of the signals received from the wireless device resulting in that the received power is more or less the same regardless of the polarization of the received signal.

According to aspects, the configuring comprises configuring the antenna power pattern as a wide beam pattern spanning an angular interval between 10-40 degrees, and preferably about 15-30 degrees. Wide beams are particularly suitable for an initial access procedure where a wireless device first synchronizes and connects to the wireless access network. The methods disclosed herein are particularly suitable for use with wide beam antenna patterns. It is appreciated that such wide beam antenna pattern may also span angular ranges beyond 40 degrees.

According to aspects, the configuring for transmission comprises configuring the antenna power pattern in dependence of a desired coverage area of the first signal. It is an advantage that the disclosed methods are applicable for a wide range of different power patterns, since the generated antenna pattern can be adapted to obtain different desired coverage areas. For instance, cell coverage in some regions may be improved by adjusting the antenna power pattern to focus more energy in a given direction, while maintaining the advantage of resilience to, e.g., gain fluctuations for the different received polarizations.

According to aspects, the configuring for reception comprises configuring a feed network of the antenna array by changing associations between antenna ports of the antenna array and antenna elements of both the first and of the second polarization. By changing associations between antenna ports of the antenna array and antenna elements of both the first and of the second polarization, the above mentioned effects of being able to generate the antenna power pattern is obtained in an efficient manner.

According to aspects, the method also comprises combining the second signal received via the first receive antenna port with the second signal received via the second receive antenna port, wherein the combining is based on a received signal quality on the first receive antenna port in relation to a received signal quality on the second receive antenna port. By accounting for variations in received signal quality, such as variations in signal to noise ratio or variations in received signal power, reduced receiver performance due to variations in received signal quality at the two polarizations is mitigated.

There is also disclosed herein control units, antenna arrays, wireless access networks, computer program products and computer programs associated with the above mentioned advantages.

BRIEF DESCRIPTION OF THE DRAWINGS

The present disclosure will now be described in more detail with reference to the appended drawings, where.

DETAILED DESCRIPTION

Aspects of the present disclosure will now be described more fully hereinafter with reference to the accompanying drawings. The different devices, systems, computer programs, computer program products and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
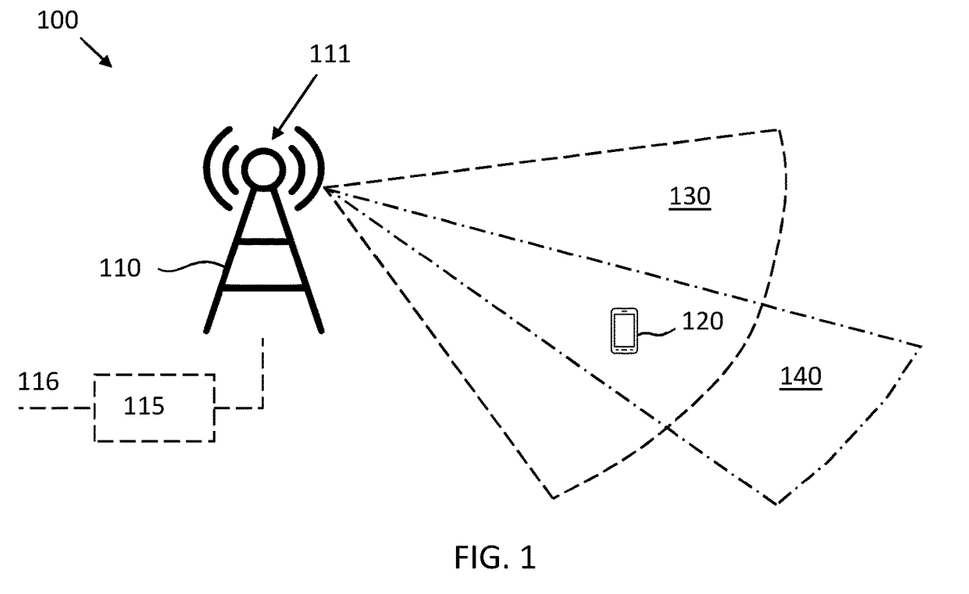
FIG. 1 shows an example wireless access network.

FIG. 1 schematically illustrates a wireless access network 100 where an access point 110 or transmission point (TRP) is arranged to communicate with a wireless device 120 via an antenna.

The TRP comprises some sort of phased antenna array 111, or even an advanced antenna system (AAS), configured for generating one or more antenna patterns, where each antenna pattern comprises one or more antenna beams. The antenna array is arranged to be controlled by an antenna array control unit 115 which is only schematically illustrated in FIG. 1. This antenna array control unit may be connected 116 to other network resources and processing units deployed remotely from the antenna array, such as one or more cloud-based computing platforms or the like. The AAS may comprise co-located antenna elements or antenna elements that are spatially distributed from each other, e.g., as part of a coordinated multipoint (CoMP) transmission system.

The antenna array 111 is arranged to generate both wide beams 130 and more narrow beams 140. The wide beams cover a larger portion of the service area of the TRP in terms of angle but is normally associated with a reduced gain compared to the more narrow beams 140. As mentioned above, the wide beams may be used during initial synchronization between the access network and the wireless device 120, such as during transmission of the synchronization signal block (SSB) to the wireless device 120, according to 3GPP TS 38.211. However, the wide beams can also be used for other purposes such as during communication sessions where only a few short data packets are exchanged between the TRP 110 and the wireless device 120. For instance, in case the wireless access network 100 is a 3GPP defined network the communication over the wide beam on uplink may also comprise any of a physical random access channel (PRACH) message, an msg3 message or radio resource control connection request, a channel state information (CSI) report, a physical uplink shared channel (PUSCH) message, and/or a physical uplink control channel (PUCCH) message. Downlink transmissions over the wide beam may comprise any of a tracking reference signal (TRS), a physical downlink control channel (PDCCH) message, a random access response (RAR) message, and/or a contention resolution message.

According to some aspects, the wide beam 130 is associated with an antenna power pattern which spans an angular interval between 10-40 degrees, and preferably about 15-30 degrees in azimuth and/or elevation. The techniques disclosed herein are most advantageously applied in combination with wider beams, such as beams wider than say 15 degrees, and it is appreciated that there is no distinct upper limit on beam width associated with the proposed methods.

Figure 2A:
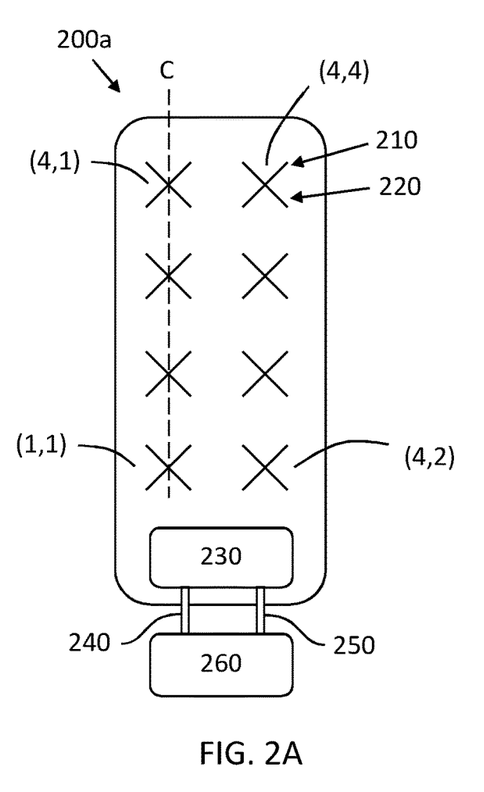
FIGS. 2A-B show some example dual polarized antenna arrays comprising antenna elements.
Figure 2B:
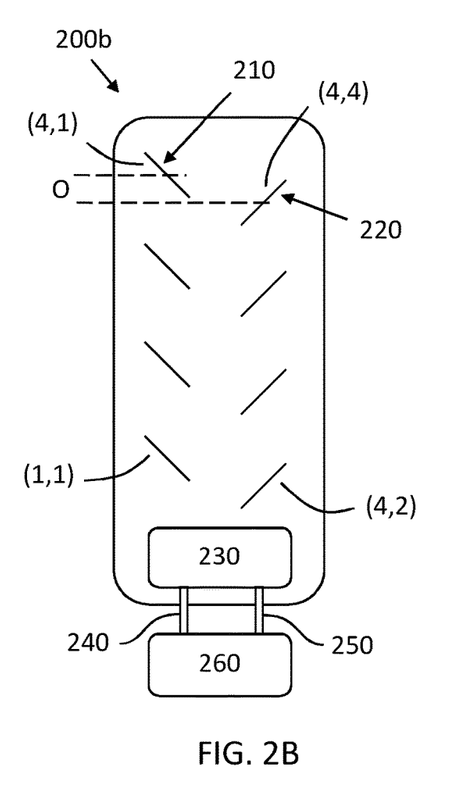

FIGS. 2A and 2B schematically illustrate some example dual polarized antenna arrays 200a, 200b with antenna elements 210, 220 of different polarizations. These antenna elements can be arranged in dual polarized arrays aligned with some centrum line C as illustrated in FIG. 2A, or the antenna elements can be arranged in single polarized arrays as shown in the example in FIG. 2B. The elements of an array are normally aligned with respect to a centrum line C, but this is not a requirement—many different element geometries can be considered. The single polarized arrays may be offset O with respect to each other. It is appreciated that the techniques disclosed herein are not limited to any particular form or geometry of antenna array, in particular, the herein disclosed techniques are applicable to antenna arrays with any number of columns, not just single or double column antenna arrays. An antenna feed network 230 connects the antenna elements 210, 220 to antenna ports 240, 250, sometimes referred to as panel ports. There may, in general, be any number of ports for a single antenna array.

It is appreciated that antenna arrays may comprise analog components for interconnecting antenna elements with antenna ports to a varying degree, with a varying number of radio transceiver chains connected to the antenna elements. An antenna port may be a physical port connected to antenna elements via an analog network. An antenna port may also be a virtual antenna port defined in software. Some antenna arrays may even comprise full transceiver chains for each antenna element and thus comprise a large number of physical antenna ports which then can be freely combined into various virtual antenna ports. Thus, the concept of an antenna port may comprise both physical antenna ports, i.e., with physical connectors, or virtual antenna ports defined in software, or combinations thereof. The concept of an antenna port is thus to be interpreted broadly herein.

A transceiver arrangement 260 is connected to the antenna array via the antenna ports 240, 250. The antenna ports may be labelled as a first receive antenna port RX1 and as a second receive antenna port RX2 which can be arranged to have mutually orthogonal polarizations.

It is appreciated that some cross-polarization leakage may occur, and that perfectly orthogonally polarized antenna ports are difficult to generate in practice. Normally, a cross-polarization discrimination (XPD) on the order of about 25 dB must be tolerated.

It is also appreciated that the herein disclosed techniques do not rely on any particular form of transceiver, nor is any particular form of modulation, encoding or decoding of transmitted and received signals assumed.

In a radio antenna pattern, the half power beam width is often defined as the angle between the half-power (−3 dB) points of the main lobe, when referenced to the peak effective radiated power of the main lobe. Beam width is usually but not always expressed in degrees for the horizontal plane (azimuth), but beam width in terms of elevation may also be relevant. Other measures of beam width can also be used, such as the angular span which comprises a given percentage of radiated energy.

According to the IEEE Standard 145-2013, the directivity of an antenna in a given direction is the ratio of the radiation intensity in the given direction from the antenna to the radiation intensity averaged over all other directions. The average radiation intensity is normally set equal to the total power radiated by the antenna divided by 4n. If the direction is not specified, then the direction of maximum radiation intensity is implied.

The gain of an antenna in a given direction is the ratio of the radiation intensity in a given direction to the radiation intensity that would be produced if the power accepted by the antenna were isotropically radiated. Gain is normally defined as not including losses arising from impedance and polarization mismatches and does not depend on the system to which the antenna is connected. The radiation intensity of an antenna corresponding to the isotropically radiated power is equal to the power accepted by the antenna divided by 4n. If an antenna is without dissipative loss, then in any given direction its gain is equal to its directivity.

A partial gain of an antenna for a given polarization in a given direction, is that part of the radiation intensity corresponding to a given polarization divided by the radiation intensity that would be obtained if the power accepted by the antenna were isotropically radiated. The total gain of an antenna in a specified direction is the sum of the partial gains for any two orthogonal polarizations.

A beamforming weight is a (normally complex) coefficient which multiples a signal component prior to transmission from an antenna element (or after reception). Beamforming weights may be grouped into beamforming weight vectors. An antenna element is herein assumed connected to a port if the respective beamforming weight is non-zero. A set of beamforming weights, i.e., a weight vector, is sometimes referred to as a virtualization.

In 3GPP NR, the SSB block is transmitted, for each given time instant, over a single antenna port, see, e.g., 3GPP TS 38.211, v. 16.1.0, section 8.4.3. The virtualization (or beamforming weights) for that antenna port is, at least in some cases, based on dual polarization beam forming (DPBF) for purposes of efficient use of power amplifier resources. Aspects of the technique was discussed in, e.g., EP3507915A1, US20170352953A1, and EP3507915A1. DPBF is known in general and will therefore not be discussed in more detail herein.

The DPBF beamforming weights define the connections between an antenna port and antenna elements having two orthogonal or at least different polarizations. Note that an antenna port here may be a panel port of the antenna array, or some form of physical antenna port, or a virtual antenna port defined in software such as a virtualization. The beamforming weight vectors w consists of two parts where a first beamforming weight vector, $w_A$, defines the connection between a first antenna port and elements having polarization A. Similarly, a second beamforming weight vector, $w_B$, defines the connection between a second antenna port and elements having polarization B, i.e., $$w = \begin{bmatrix} w_A \\ w_B \end{bmatrix}.$$

Sometimes, the same virtualization as used for transmission of, e.g., the SSB is used also for reception of the SSB measurement report (as well as for reception of PRACH, Msg3, Contention Resolution Message and beam report of initial P2 beam sweep, i.e., for DL beam management in a 3GPP defined network. It is also possible that the SSB beam will be used for the full data session for wireless devices with small packages, since it might not be worth to perform a P2 beam sweep for such wireless devices (since it requires additional overhead and latency). In this case, it is expected that the beamforming weights associated with transmission of the SSB beam will be used for reception of the data transmissions (and associated UL signals) as well.

Figure 3:
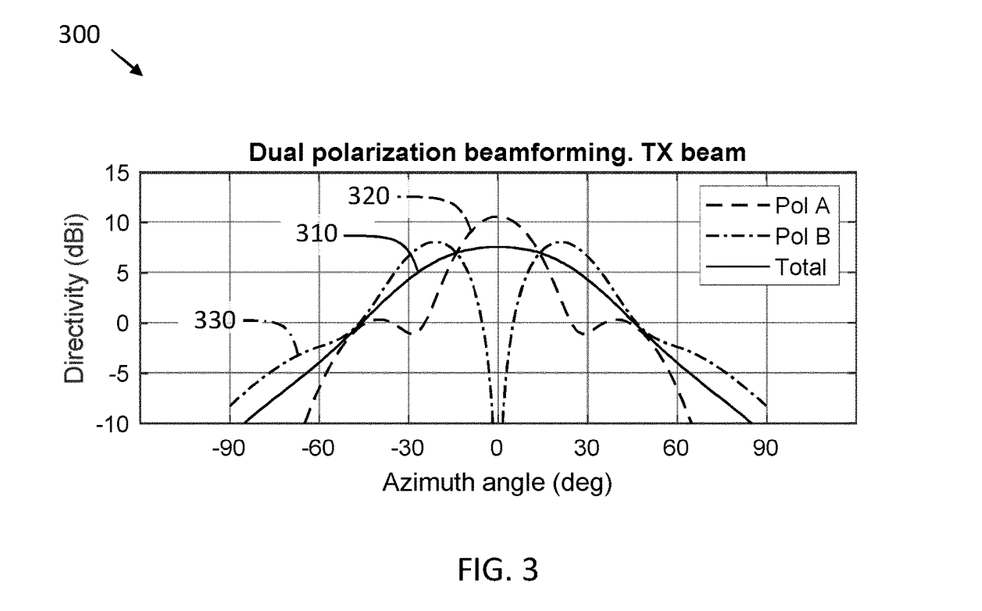
FIGS. 3-5 are graphs illustrating antenna directivity vs azimuth angle.
Figure 4:
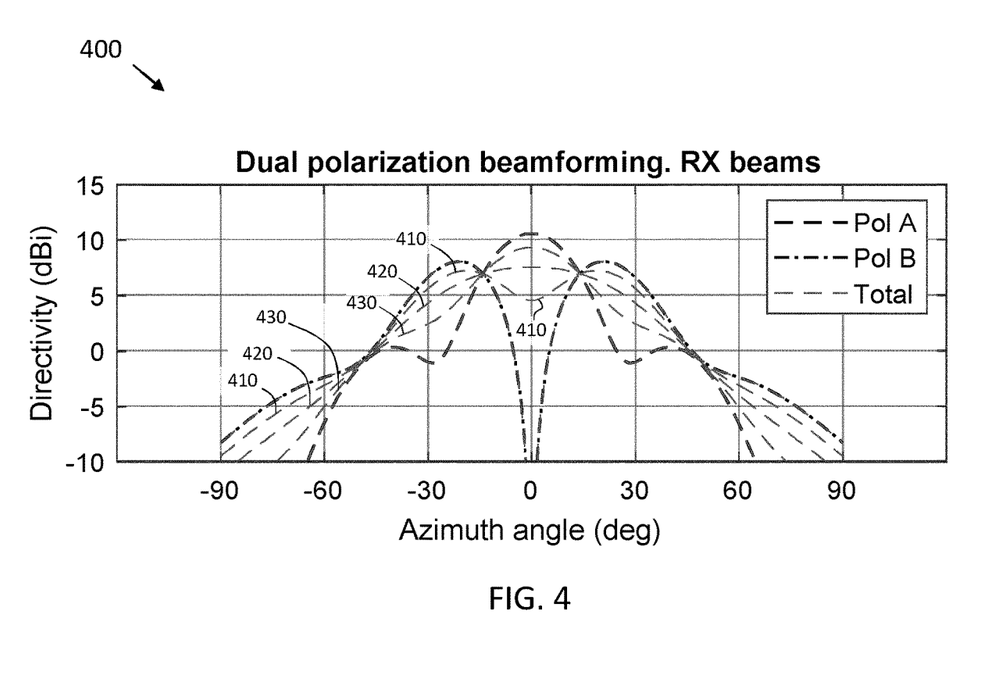
Figure 5:
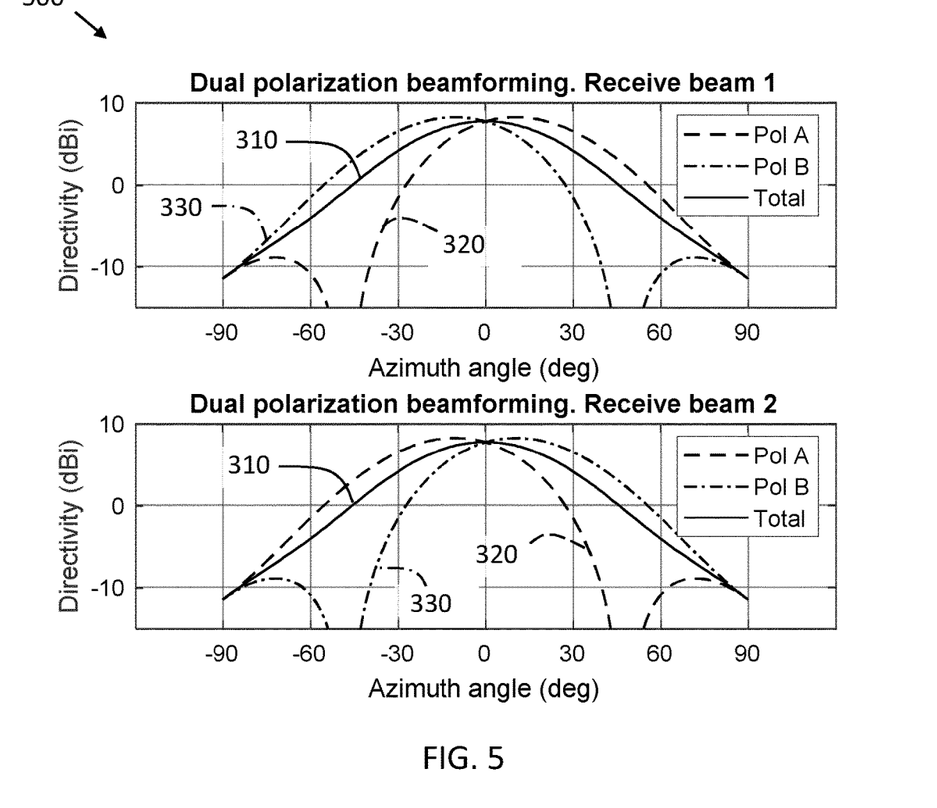

FIGS. 3-5 are graphs 300, 400, 500 illustrating example antenna patterns in terms of antenna directivity (measured in dBi) vs azimuth angle in degrees. These graphs illustrate symmetric and even antenna patterns. It is, however, appreciated that the methods disclosed herein are also applicable to more uneven antenna power patterns comprising more than one direction associated with increased antenna gain. Thus, the antenna power pattern 310 may comprise one or more lobes, i.e., high gain directions, of varying width.

FIG. 3 illustrates directivity 300 for each of two example panel ports, e.g., as schematically illustrated in FIGS. 2A and 2B. The two polarizations are here referred to as polarization A 320 (pol A) and polarization B 330 (pol B). The directivity for the antenna port, shown as 'Total' 310 in FIG. 3, is plotted under the assumption that the antenna ports are fed with equal power.

However, as can be seen from the example, the directivity for individual polarizations 320, 330 may fluctuate significantly with azimuth angle whereas the directivity for the antenna port 310 (defined by the beamforming weight vectors w) does not show such fluctuations but rather the desired beam shape. This antenna port is suitable for transmission since it generates an even and wide antenna beam.

The antenna power pattern 310 in FIG. 3 is an example of a desired antenna power pattern. It is appreciated that this antenna power pattern may be adapted to basically any desired antenna pattern. The antenna power pattern 310 may, e.g., be configured in dependence of a desired coverage area of the antenna array 111, 200a, 200b.

The fluctuations for individual polarizations result in that the received power, in each direction, despite diversity reception on two receive ports may vary a lot depending on the polarization state of the received signal. This is exemplified in FIG. 4 which illustrates directivity normalized beam patterns 400 for the two polarizations (pol A and pol B) as well as the resulting power gain (indicated by dashed lines 410, 420, 430) depending on the polarization of the received signal for five different cases assuming maximum ratio combining reception of the signal (MRC).

The polarization in the example 400 for the received signal has been varied such that the fraction of received power in the first polarization (pol A) ranges from 0 to 1.00 and correspondingly from 1.00 to 0 for the second polarization (pol B), in steps of 0.25. As can be seen there is a risk that the received power is very low due to polarization mismatch. Note that for some power relations, AB=0/1 and 1/0, the received power curve coincides with either of the pol A or pol B curves.

To summarize, FIG. 4 shows an example of directivity for the antenna ports (pol A and pol B) and directivity for the antenna port assuming five different splits of power between the antenna ports due to variation in the polarization state of the impinging wave.

A main concept of the herein disclosed techniques relates to the generation of at least two sets of virtualizations (or beam forming weight vectors) by means of DPBF. A first set with a single antenna port, used for transmission, and the second set with two antenna ports used for reception. All three antenna ports have substantially identical power patterns and the two antenna ports in the second set are orthogonally or at least differently polarized. The virtualizations are based on an "array expansion technique" which enables different virtualizations to have identical power patterns despite these are connected to different number of antenna elements. This way a power efficient transmit beam is generated by the transmit port, and full-fledged diversity reception can be exploited using the signals on the two orthogonally polarized receiver ports.

One of the advantages of the invention is that the transceiver 260 becomes insensitive to the polarization of the signals received from the wireless device 120 on the uplink (UL), resulting in that the received power is effectively the same no matter the polarization state of the UL signal. By that, the fluctuations with azimuth angle as shown in the example of FIG. 4 will be less pronounced and may even be removed entirely by signal processing in the transceiver 260.

According to an example, the herein proposed scheme includes the design of two sets of beamforming weight vectors, one set used for transmission of signals to the wireless device 120 and one set used for reception of signals from the wireless device 120.

According to an example, the DPBF beamforming weight vector used for transmission is defined by $$w_{TX} = \begin{bmatrix} w_A \\ w_B \end{bmatrix}$$

Where $w_A$ defines the beamforming weight vector applied to panel elements of polarization A and $w_B$ defines the beamforming weight vector applied to panel elements of polarization B, where polarization A is different or even orthogonal to polarization B.

For a sufficiently large array, in the example herein four dual-polarized columns, the beamforming weights used for transmission can, via an expansion technique, be based on beamforming weights for a smaller number of elements.

The procedure will now be exemplified for a one dimensional uniform linear array (ULA) but is equally applicable for a uniform rectangular array (URA), i.e., a two-dimensional array. The herein disclosed techniques may also be generalized to other forms of antenna array geometries in a straight-forward manner.

An element numbering convention is indicated in FIGS. 2A and 2B, here in two dimensions, i.e., rows R and columns C (R,C) for an array of size 4×2. The same numbering convention applies for both polarizations in FIG. 2A. Note that the total number of antenna elements N is the total number of antenna elements in the array, i.e., with R rows and C columns of dual polarized antenna elements, the total number of elements is N=2RC. Consequently, for FIG. 2B, N=16.

Start by defining a beam weight vector, $w_{RX1}$, for a first receive port using only half of the array, in this case N/2 elements for an array with a total of N elements $$w_{RX1o} = \begin{bmatrix} w_{A1o} \\ w_{B1o} \end{bmatrix}$$

This weight vector defines the desired antenna power pattern which will be generated both by the transmit port as well as by the receive ports. A wide beam may be desired, e.g., for transmission of the SSB in a 3GPP network, but other antenna power patterns may just as well be generated by adapting $w_{RX1o}$ by laboratory experiment or by computer simulation to the desired antenna power pattern. The desired antenna pattern may comprise one or more directions associated with increased gain. The desired antenna pattern may also comprise one or more directions associated with reduced gain, for instance in order to reduce co-cell interference in some directions.

The weight vector $w_{RX1o}$ is then zero padded, with vector z of size N/2×1, to contain as many elements as there is antenna elements, resulting in $$w_{RX1} = \begin{bmatrix} w_{A1} \\ w_{B1} \end{bmatrix} \text{ where}$$

$$w_{A1} = \begin{bmatrix} w_{A1o} \\ z \end{bmatrix} \text{ and}$$

$$w_{B1} = \begin{bmatrix} w_{B1o} \\ z \end{bmatrix}.$$

The next step is to design a second beam weight vector, for a second receive port, with the same power pattern but orthogonal polarization according to $$w_{RX2} = \begin{bmatrix} Jw_{B1}^* \\ -Jw_{A1}^* \end{bmatrix}$$

where J denotes the exchange matrix (also known as the reverse identity matrix) and where ( )* denotes complex conjugate. Finally, the beam weight vector to be used for the transmit port is defined as the sum of the two weight vectors $$w_{TX1} = w_{RX1} + w_{RX2} = \begin{bmatrix} w_{A1} + Jw_{B1}^* \\ w_{B1} - Jw_{A1}^* \end{bmatrix} = \begin{bmatrix} w_{A1o} \\ Jw_{B1o}^* \\ w_{B1o} \\ -Jw_{A1o}^* \end{bmatrix}.$$

Note that the matrix J is not the same size matrix on the two sides of the equality sign. To the left the dimension of J is N/2×N/2 and to the right the dimension of J is N/4×N/4. Note also that $w_{RX1}$ and $w_{RX2}$ both contain zeros in complementary positions, such that the sum of the weight vectors is rather to be seen as a combination of the weight vectors. Note also that the minus sign $w_{RX1}$ and $w_{RX2}$ represents a phase shift of π radians, which phase shift can be arbitrarily distributed between the two polarizations and over the elements.

To arrive at corresponding equations for an URA, define weight matrices for polarizations A, $W_{A1o}$, and B, $W_{B1o}$, for a first receive port as matrices of size R×C, with R being the number of element rows and C being the number of element columns. Then convert these matrices to vectors by $w_{A1o}=\text{vec}(W_{A1o})$ and $w_{B1o}=\text{vec}(W_{Bio})$, where vec( ), is the vectorize operation, after which the same equations as for the ULA discussed above applies.

FIG. 5 presents an example 500 of the antenna patterns according to the example discussed above. Again, note that 'Total' here represents the directivity for the "antenna port" assuming that receive beam 1 has the same pattern for the first polarization (pol A) as receive beam 2 has for the second polarization (pol B). Receive beam 1 has the same antenna pattern for the second polarization (pol B) as receive beam 2 has for the first polarization (pol A). Thus, the two receive beams have the same patterns but orthogonal or at least significantly different polarizations.

To summarize, there has been disclosed herein a dual polarized antenna array comprising antenna elements 210, 220 of a first polarization (pol A) and of a second polarization (pol B). Each antenna element is associated with a respective beamforming weight vector for communication with a wireless device 120.

The antenna array comprises a configurable antenna feed network 230 which is arranged to provide a transmit antenna port TX by configuring a first set of beamforming weight vectors $w_{TX1}$ connecting the transmit port TX to antenna elements of the first and of the second polarization. The transmit antenna port TX is associated with an antenna power pattern 310.

The antenna feed network 230 is also arranged to provide a first receive antenna port RX1 and a second receive antenna port RX2 by configuring a second set of beamforming weights $w_{RX1}$ connecting the first receive antenna port RX1 to antenna elements of the first and of the second polarization, and a third set of beamforming weights $w_{RX2}$ connecting the second receive antenna port RX2 to antenna elements of the first and of the second polarization. Each of the receive antenna ports RX1, RX2 is associated with the antenna power pattern 310, i.e., the same antenna pattern as the TX port, and the receive antenna ports RX1, RX2 have different polarizations.

Figure 6:
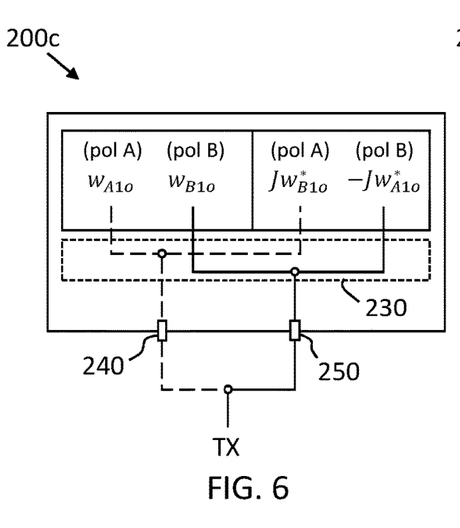
FIG. 6 schematically illustrates an antenna feed network configured for transmit operations.

FIG. 6 schematically illustrates an example antenna array 200c configured for transmission via a single transmit port (TX). The feed network 230 here connects the first panel port 240 to elements of the first polarization (pol A) via beamforming weight vectors $w_{A1o}$ and $Jw_{B1o}*$. The feed network 230 also connects the second panel port 250 to elements of the second polarization (pol B) via beamforming weight vectors $w_{B1o}$ and $-Jw_{A1o}*$. Note that the feed network 230 may be an analogue feed network, or a digital feed network implemented in software, or a combination thereof.

Figure 7:
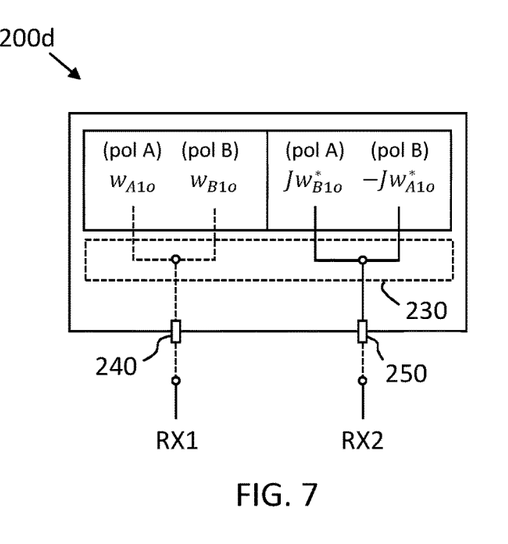
FIG. 7 schematically illustrates an antenna feed network configured for receive operations.

FIG. 7 shows the example antenna array 200d now configured for reception. In order to switch between transmit and receive beams there is a need to reconfigure the feed network 230 (change virtualizations or beamforming weights). This is not only a matter of changing beamforming weights within a polarization but also to be able to connect between polarizations.

According to some aspects, the feed network 230 of the antenna array 200d is configured for reception by changing associations between antenna ports of the antenna array and antenna elements of both the first and of the second polarization, compared to the configuration of the feed network for the antenna array 200c when configured for transmission.

According to some other aspects, the antenna arrays 111, 200a, 200b, 200c, 200d discussed herein comprises N/2 antenna elements of the first polarization pol A and N/2 antenna elements of the second polarization pol B. The transmit antenna port TX is connected to all N antenna elements, the first receive antenna port RX1 is connected to N/2 antenna elements out of the N elements, and the second receive antenna port RX2 is connected to the remaining N/2 antenna elements.

According to some further aspects, the antenna array 111, 200a, 200b, 200c, 200d comprises N/2 antenna elements of the first polarization pol A and N/2 antenna elements of the second polarization pol B. The transmit antenna port TX is connected to all N antenna elements, and wherein the first and second receive antenna ports RX1, RX2 are both connected to all N antenna elements.

Figure 8:
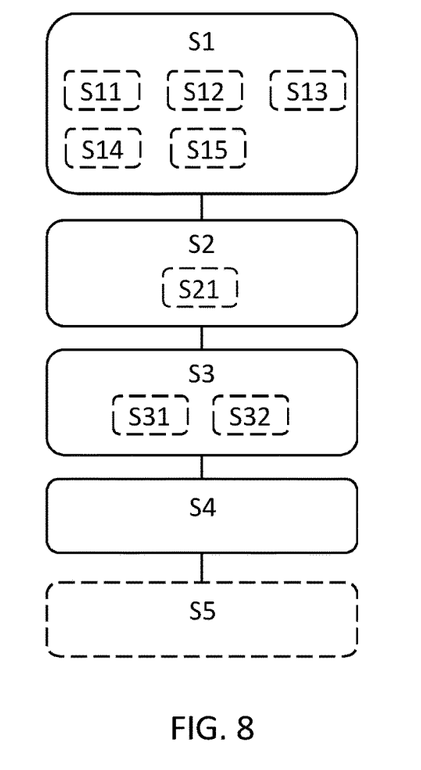
FIG. 8 shows a flowchart illustrating methods.

FIG. 8 shows a flowchart illustrating methods which summarize the discussions above. In particular, FIG. 8 illustrates a method of configuring a dual polarized antenna array 111, 200a, 200b, 200c, 200d for communication between a wireless device 120 and a wireless access network 100, such as exemplified and discussed above in connection to FIG. 1. The antenna array 111, 200a, 200b, 200c, 200d comprises antenna elements 210, 220 with respective polarizations, where each antenna element is associated with a respective beamforming weight, e.g., as exemplified in FIGS. 2A and 2B.

The disclosed method comprises configuring S1 the antenna array 111, 200a, 200b, 200c, 200d for transmission by a first set of beamforming weights $w_{TX1}$, wherein the first set of beamforming weights, i.e., a beamforming vector, is arranged to provide a transmit antenna port TX connected to antenna elements of a first polarization pol A and of a second polarization pol B, wherein the transmit antenna port TX is associated with an antenna power pattern 310. The transmit port uses elements of both polarizations 320, 330 to generate an antenna power pattern 310, e.g., as exemplified in FIG. 3. Although the powers transmitted in the two polarizations fluctuate over beam angle, the sum of the two is relatively even, which in this case is as desired. However, as discussed above, any antenna power pattern may be used as base for the disclosed methods.

The method also comprises transmitting S2 a first signal via the transmit antenna port TX on a downlink (DL) from the antenna array 111, 200a, 200b, 200c, 200d to the wireless device 120.

The method furthermore comprises configuring S3 the antenna array 111, 200a, 200b, 200c, 200d for reception by a second $w_{RX1}$ and a third $w_{RX2}$ set of beamforming weights, i.e., beamforming vectors. The second set of beamforming weights $w_{RX1}$ is arranged to provide a first receive antenna port RX1 connected to antenna elements of the first and of the second polarization, and the third set of beamforming weights $w_{RX2}$ is arranged to provide a second receive antenna port RX2 connected to antenna elements of the first and of the second polarization, where each of the receive antenna ports RX1, RX2 is associated with the antenna power pattern 310, and where the receive antenna ports RX1, RX2 have different polarizations. Notably, both receive ports are associated with the same antenna power pattern 310, which is also the antenna power pattern associated with the single transmit port.

The method comprises receiving S4 a second signal on an uplink (UL) from the wireless device 120 to the antenna array 111, 200a, 200b, 200c, 200d, via the first receive antenna port RX1 and the second receive antenna port RX2. Thus, diversity reception is enabled, since the two receive ports are of different polarizations. This means that the propagation channel between the wireless device 120 and the antenna array, in combination with the polarization state of the signal transmitted from a wireless device, can attenuate polarizations differently, which can be accounted for at the receiver, e.g., by applying MRC reception or the like.

The antenna power pattern 310 used for both transmission and reception may be an evenly distributed wide beam as discussed above. However, in some cases, other antenna power patterns may be desired. For instance, an antenna power pattern may be designed to cover some specific geographical region or part of a building. In other words, according to aspects, the configuring for transmission comprises configuring S12 the antenna power pattern in dependence of a desired coverage area of the first signal.

According to other aspects, the wireless access network 100 is a 3GPP defined network, and the transmitting comprises transmitting S21 a first signal comprising any of a synchronization signal block (SSB) signal, a tracking reference signal (TRS), a physical downlink control channel (PDCCH) message, a random access response (RAR) message, and/or a contention resolution message. Thus, it is appreciated that the herein disclosed techniques can be applied with advantage for the transmission of a number of different types of signals. Similarly, according to aspects, the wireless access network 100 is a 3GPP defined network, and the receiving comprises receiving S41 a second signal comprising any of an SSB response signal, a physical random access channel (PRACH) message, an msg3 message or radio resource control connection request, a channel state information (CSI) report, a physical uplink shared channel (PUSCH) message, and/or a physical uplink control channel (PUCCH) message.

According to some aspects, the configuring for reception comprises configuring S31 the first receive antenna port RX1 and the second receive antenna port RX2 to have mutually orthogonal polarizations. Configuring receive ports to have substantially orthogonal polarizations may improve receive conditions, which is an advantage. However, it is noted that it is not a requirement to have exactly orthogonal polarizations. Most of the advantages mentioned herein associated with the disclosed methods and devices are obtained also for sufficiently different polarizations on the two receive ports.

According to some other aspects, the configuring for reception comprises configuring S32 a feed network 230 of the antenna array 111, 200a, 200b, 200c, 200d by changing associations between antenna ports of the antenna array and antenna elements of both the first and of the second polarization. These aspects set the disclosed methods apart from the prior art in that the feed network configuring from transmit to receive mode of operation is not only a matter of changing beamforming weights within a polarization but also a matter of changing connections between polarizations. This also means that the panel ports according to the current disclosure are not only connected to antenna elements having the same polarization, but to elements of both polarizations.

According to aspects, the method comprises combining S5 the second signal received via the first receive antenna port RX1 with the second signal received via the second receive antenna port RX2. The combining is based on a received signal quality on the first receive antenna port RX1 in relation to a received signal quality on the second receive antenna port RX2. Received signal quality may, e.g., comprise a signal to noise ratio (SNR), a signal to interference and noise ratio (SINK), or a received power metric such as received signal strength (RSS). One example of this type of combining is maximum ratio combining (MRC), and a wide variety of other applicable receive algorithms are also known.

According to some aspects, the antenna array 111, 200a, 200b, 200c, 200d comprises N/2 antenna elements of the first polarization pol A and N/2 antenna elements of the second polarization pol B. The method comprises connecting S13 the transmit antenna port TX to all N antenna elements, connecting the first receive antenna port RX1 to N/2 antenna elements out of the N elements, and connecting the second receive antenna port RX2 to the remaining N/2 antenna elements.

According to some other aspects, the method comprises defining S14 the power pattern 310 by N/2 beamforming weights $$\begin{bmatrix} w_{A1o} \\ w_{B1o} \end{bmatrix},$$

where $w_{A1o}$ represents N/4 beamforming weights associated with antenna elements of the first polarization, and where $w_{B1o}$ represents N/4 beamforming weights associated with antenna elements of a second polarization, wherein the second set of beamforming weights $w_{RX1}$ is given by $$w_{RX1} = \begin{bmatrix} w_{A1} \\ w_{B1} \end{bmatrix},$$

where $$w_{A1} = \begin{bmatrix} w_{A1o} \\ z \end{bmatrix}, w_{B1} = \begin{bmatrix} w_{B1o} \\ z \end{bmatrix},$$

and where z is an all-zero vector of length N/4, wherein the third set of N/2 beamforming weights $w_{RX2}$ is given by $$w_{RX2} = \begin{bmatrix} e^{j\varphi} J w_{B1}^* \\ e^{j\phi+\pi} J w_{A1}^* \end{bmatrix},$$

where φ represents an arbitrary phase, ( )* denotes complex conjugate, and where J represents an N/2 by N/2 reverse identity matrix, and wherein the first set of beamforming weights $w_{TX1}$ is given by $$w_{TX1} = w_{RX1} + w_{RX2} = \begin{bmatrix} w_{A1} + e^{j\varphi} J w_{B1}^* \\ w_{B1} + e^{j\phi+\pi} J w_{A1}^* \end{bmatrix} = \begin{bmatrix} w_{A1o} \\ e^{j\phi} J w_{B1o}^* \\ w_{B1o} \\ e^{j\phi+\pi} J w_{A1o}^* \end{bmatrix}.$$

Figure 9:
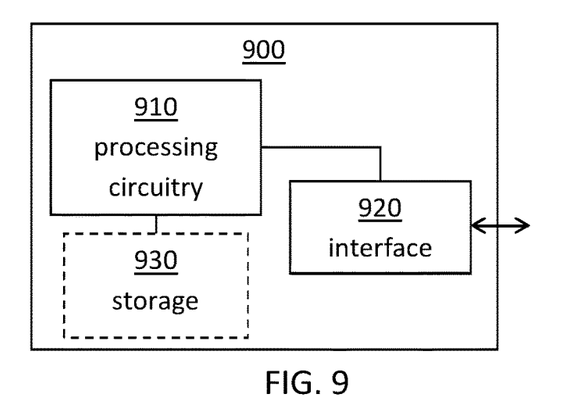
FIG. 9 schematically illustrates processing circuitry.

FIG. 9 schematically illustrates, in terms of a number of functional units, the components of a control unit 900 according to embodiments of the discussions herein. The control unit may, e.g., form part of an antenna array control unit 115 or a beamforming network controller for controlling a beamforming network such as the antenna feed network 230 discussed in connection to FIGS. 2A and 2B.

Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA. The processing circuitry thus comprises a plurality of digital logic components.

Particularly, the processing circuitry 910 is configured to cause the system 130 to perform a set of operations, or steps. For example, the storage medium 930 may store the set of operations, and the processing circuitry 910 may be configured to retrieve the set of operations from the storage medium 930 to cause the system 130 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The sensor signal processing system 130 further comprises an interface 920 for communications with at least one external device. As such the interface 920 may comprise one or more transmitters and receivers, comprising analogue and digital components and a suitable number of ports for wireline communication.

The processing circuitry 910 controls the general operation of the system 130, e.g. by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
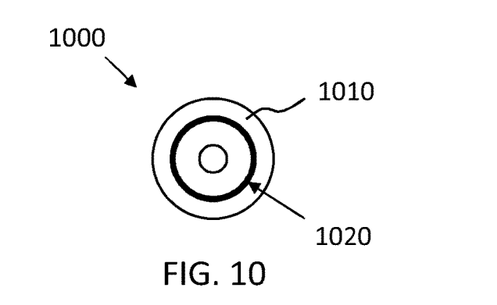
FIG. 10 shows a computer program product.

FIG. 10 shows a computer program product 1000 comprising computer executable instructions 1010 stored on media 1010 to execute any of the methods disclosed herein.

The computer program 1020 may be set up for configuring a dual polarized antenna array 111, 200a, 200b, 200c, 200d for communication between a wireless device 120 and a wireless access network 100, wherein the antenna array 111, 200a, 200b, 200c, 200d comprises antenna elements 210, 220 with respective polarizations, and where each antenna element is associated with a respective beamforming weight, the computer program 1020 comprising computer code which, when run on an antenna array control unit 900, causes the antenna array to configure S1 the antenna array 111, 200a, 200b, 200c, 200d for transmission by a first set of beamforming weights $w_{TX1}$, wherein the first set of beamforming weights is arranged to provide a transmit antenna port TX connected to antenna elements of a first polarization pol A and of a second polarization pol B, wherein the transmit antenna port TX is associated with an antenna power pattern 310, transmit S2 a first signal via the transmit antenna port TX on a downlink (DL) from the antenna array 111, 200a, 200b, 200c, 200d to the wireless device 120, configure S3 the antenna array 111, 200a, 200b, 200c, 200d for reception by a second $w_{RX1}$ and a third $w_{RX2}$ set of beamforming weights, wherein the second set of beamforming weights $w_{RX1}$ is arranged to provide a first receive antenna port RX1 connected to antenna elements of the first and of the second polarization, wherein the third set of beamforming weights $w_{RX2}$ is arranged to provide a second receive antenna port RX2 connected to antenna elements of the first and of the second polarization, where each of the receive antenna ports RX1, RX2 is associated with the antenna power pattern 310, and where the receive antenna ports RX1, RX2 have different polarizations; and to receive S4 a second signal on an uplink, UL, from the wireless device 120 to the antenna array 111, 200a, 200b, 200c, 200d, via the first receive antenna port RX1 and the second receive antenna port RX2.

The invention claimed is:

1. A method of configuring a dual polarized antenna array for communication in a wireless access network, the antenna array comprising antenna elements with respective polarizations and an antenna feed network, where each antenna element is associated with a respective beamforming weight, the method comprising:

configuring the antenna array for transmission by a first set of beamforming weights $w_{TX1}$, wherein the first set of beamforming weights is arranged, via the antenna feed network, to provide a transmit antenna port connected to antenna elements of a first polarization and of a second polarization, wherein the transmit antenna port is associated with an antenna power pattern, wherein the first polarization has a first directivity and the second polarization has a second directivity, and the respective directivities of the first and the second polarizations vary differently along the antenna power pattern associated with the transmit antenna port;

transmitting a first signal via the transmit antenna port on a downlink (DL) of the wireless access network;

configuring the antenna array for reception by a second $w_{RX1}$ and a third $w_{RX2}$ set of beamforming weights, wherein the second set of beamforming weights $w_{RX1}$ is arranged, via the antenna feed network, to provide a first receive antenna port connected to antenna elements of the first and of the second polarization, wherein the third set of beamforming weights $w_{RX2}$ is arranged, via the antenna feed network, to provide a second receive antenna port connected to antenna elements of the first and of the second polarization, where each of the receive antenna ports is associated with the antenna power pattern, wherein the respective directivities of the first and the second polarizations vary differently along the respective antenna power patterns associated with the first and the second receive antenna ports, and where the respective variations of directivities of the first and the second receive antenna ports are different; and receiving a second signal on an uplink (UL) of the wireless access network, via the first receive antenna port and the second receive antenna port.

2. The method of claim 1, wherein the method further comprises configuring the antenna power pattern as a wide beam pattern spanning an angular interval between 10-40 degrees.

3. The method of claim 1, wherein the configuring for transmission comprises configuring the antenna power pattern in dependence of a desired coverage area of the first signal.

4. The method of claim 1, wherein the wireless access network is a third generation partnership program defined network, where the first signal comprises a synchronization signal block signal, a tracking reference signal, a physical downlink control channel message, a random access response message, and/or a contention resolution message.

5. The method of claim 1, wherein the configuring for reception comprises configuring the first receive antenna port and the second receive antenna port to have mutually orthogonal polarizations.

6. The method of claim 1, wherein the configuring for reception comprises configuring the antenna feed network of the antenna array by changing associations between antenna ports of the antenna array and antenna elements of both the first and of the second polarization, compared to the configuration of the feed network for the antenna array when configured for transmission.

7. The method of claim 1, wherein the wireless access network is a third generation partnership program, 3GPP, defined network, and where the second signal comprises: a Synchronization Signal Block (SSB) response signal, a physical random access channel (PRACH) message, a random access procedure message, a radio resource control connection request, a channel state information (CSI) report, a physical uplink shared channel (PUSCH) message, and/or a physical uplink control channel (PUCCH) message.

8. The method of claim 1, further comprising combining the second signal received via the first receive antenna port with the second signal received via the second receive antenna port, wherein the combining is based on a received signal quality on the first receive antenna port in relation to a received signal quality on the second receive antenna port.

9. The method of claim 1, wherein
the antenna array comprises N antenna elements, where N>1,
N/2 of the N antenna elements are of the first polarization,
N/2 of the N antenna elements are of the second polarization, and
the method further comprises:
connecting the transmit antenna port to all N antenna elements,
connecting the first receive antenna port to N/2 antenna elements out of the N elements, and
connecting the second receive antenna port to the remaining N/2 antenna elements.

10. The method of claim 1, wherein
the antenna array comprises N antenna elements, where N>1,
N/2 of the N antenna elements are of the first polarization,
N/2 of the N antenna elements are of the second polarization, and
the method further comprises:
connecting the transmit antenna port to all N antenna elements, and
connecting the first and second receive antenna ports to all N antenna elements.

11. The method of claim 9, further comprising defining the power pattern by N/2 beamforming weights $$\begin{bmatrix} w_{A1o} \\ w_{B1o} \end{bmatrix},$$

where $w_{A1o}$ represents N/4 beamforming weights associated with antenna elements of the first polarization, and where $w_{B1o}$ represents N/4 beamforming weights associated with antenna elements of the second polarization, wherein the second set of beamforming weights $w_{RX1}$ is given by $$w_{RX1} = \begin{bmatrix} w_{A1} \\ w_{B1} \end{bmatrix},$$

where $$w_{A1} = \begin{bmatrix} w_{A1o} \\ z \end{bmatrix}, w_{B1} = \begin{bmatrix} w_{B1o} \\ z \end{bmatrix},$$

and where z is an all-zero vector of length N/4, wherein the third set of N/2 beamforming weights $w_{RX2}$ is given by $$w_{RX2} = \begin{bmatrix} e^{j\varphi} J w_{B1}^* \\ e^{j\phi+\pi} J w_{A1}^* \end{bmatrix},$$

where φ represents an arbitrary phase, ( )* denotes complex conjugate, and where J represents an N/2 by N/2 reverse identity matrix, and wherein the first set of beamforming weights $w_{TX1}$ is given by $w_{TX1}=w_{RX1}+w_{RX2}=$ $$w_{TX1} = w_{RX1} + w_{RX2} = \begin{bmatrix} w_{A1} + e^{j\varphi} J w_{B1}^* \\ w_{B1} + e^{j\phi+\pi} J w_{A1}^* \end{bmatrix} = \begin{bmatrix} w_{A1o} \\ e^{j\phi} J w_{B1o}^* \\ w_{B1o} \\ e^{j\phi+\pi} J w_{A1o}^* \end{bmatrix}.$$

12. An antenna array control unit comprising processing circuitry configured to perform the method of claim 1.

13. A non-transitory computer readable storage medium storing a computer program for configuring a dual polarized antenna array for communication between a wireless device and a wireless access network, wherein the antenna array comprises antenna elements with respective polarizations and an antenna feed network, and where each antenna element is associated with a respective beamforming weight, the computer program comprising computer code which, when run on an antenna array control unit, causes the antenna array to:
configure the antenna array for transmission by a first set of beamforming weights $w_{TX1}$, wherein the first set of beamforming weights is arranged, via the antenna feed network, to provide a transmit antenna port connected to antenna elements of a first polarization and of a second polarization, wherein the transmit antenna port is associated with an antenna power pattern, wherein the first polarization has a first directivity and the second polarization has a second directivity, and the respective directivities of the first and the second polarizations vary differently along the antenna power pattern associated with the transmit antenna port;
transmit a first signal via the transmit antenna port on a downlink (DL) from the antenna array to the wireless device;
configure the antenna array for reception by a second $w_{RX1}$ and a third $w_{RX2}$ set of beamforming weights, wherein the second set of beamforming weights $w_{RX1}$ is arranged, via the antenna feed network, to provide a first receive antenna port connected to antenna elements of the first and of the second polarization, wherein the third set of beamforming weights $w_{RX2}$ is arranged, via the antenna feed network, to provide a second receive antenna port connected to antenna elements of the first and of the second polarization, where each of the receive antenna ports is associated with the antenna power pattern, wherein the respective directivities of the first and the second polarizations vary differently along the respective antenna power patterns associated with the first and the second receive antenna ports, and where the respective variations of directivities of the first and the second receive antenna ports (RX1, RX2) are different; and to receive a second signal on an uplink (UL) from the wireless device to the antenna array, via the first receive antenna port and the second receive antenna port.

14. A dual polarized antenna array comprising antenna elements of a first polarization and of a second polarization, where each antenna element is associated with a respective beamforming weight for communication with a wireless device, the antenna array comprising a configurable antenna feed network, where the antenna feed network is arranged to provide a transmit antenna port by configuring a first set of beamforming weights $w_{TX1}$ connecting the transmit port to antenna elements of the first and of the second polarization, wherein the transmit antenna port is associated with an antenna power pattern, wherein the first polarization has a first directivity and the second polarization has a second directivity, and the respective directivities of the first and the second polarizations vary differently along the antenna power pattern associated with the transmit antenna port, where the antenna feed network is arranged to provide a first receive antenna port and a second receive antenna port by configuring a second set of beamforming weights $w_{RX1}$ connecting the first receive antenna port to antenna elements of the first and of the second polarization, and a third $w_{RX2}$ set of beamforming weights connecting the second receive antenna port to antenna elements of the first and of the second polarization, where each of the receive antenna ports is associated with the antenna power pattern, wherein the respective directivities of the first and the second polarizations vary differently along the respective antenna power patterns associated with the first and the second receive antenna ports, and where the respective variations of directivities of the first and the second receive antenna ports are different.

15. The dual polarized antenna array of claim 14, wherein the antenna power pattern is a wide beam pattern spanning an angular interval between 10-40 degrees.

16. The dual polarized antenna array of claim 14, wherein the antenna power pattern is configured in dependence of a desired coverage area of the antenna array.

17. The dual polarized antenna array of claim 14, wherein the first receive antenna port and the second receive antenna port are arranged to have mutually orthogonal polarizations.

18. The dual polarized antenna array of claim 14, wherein the antenna feed network of the antenna array is configured for reception by changing associations between antenna ports of the antenna array and antenna elements of both the first and of the second polarization, compared to the configuration of the feed network for the antenna array when configured for transmission.

19. The dual polarized antenna array of claim 14, wherein the antenna array comprises N antenna elements, where N>1, N/2 of the N antenna elements are of the first polarization, N/2 of the N antenna elements are of the second polarization, and the method further comprises:

connecting the transmit antenna port to all N antenna elements, connecting the first receive antenna port to N/2 antenna elements out of the N elements, and connecting the second receive antenna port to the remaining N/2 antenna elements.

20. The dual polarized antenna array of claim 14, wherein the antenna array comprises N antenna elements, where N>1, N/2 of the N antenna elements are of the first polarization, N/2 of the N antenna elements are of the second polarization, and the method further comprises:

connecting the transmit antenna port to all N antenna elements, and connecting the first and second receive antenna ports to all N antenna elements.

* * * * *